US008465244B2

(12) United States Patent
Lanigan, Sr. et al.

(10) Patent No.: US 8,465,244 B2
(45) Date of Patent: Jun. 18, 2013

(54) DISTRIBUTION SYSTEM

(75) Inventors: John J. Lanigan, Sr., Orland Park, IL (US); Peter W. Mirabella, Schererville, IN (US); John J. Lanigan, Jr., New Lenox, IL (US); William P. Lanigan, Orland Park, IL (US)

(73) Assignee: Mi-Jack Products, Inc., Hazel Crest, IL (US)

( * ) Notice: Subject to any disclaimer, the term of this patent is extended or adjusted under 35 U.S.C. 154(b) by 833 days.

(21) Appl. No.: 11/807,791

(22) Filed: May 30, 2007

(65) Prior Publication Data

US 2008/0298939 A1    Dec. 4, 2008

(51) Int. Cl.
*B65G 67/00*  (2006.01)

(52) U.S. Cl.
USPC .......................... 414/391; 414/495; 414/498

(58) Field of Classification Search
USPC ............... 414/401, 347, 377, 389, 498, 540, 414/385, 387, 390, 391, 392, 293, 396, 397, 414/399, 400, 495, 539, 344; 254/45; 410/54; 280/6.15, 6.151, 6.153
See application file for complete search history.

(56) References Cited

U.S. PATENT DOCUMENTS

| | | | |
|---|---|---|---|
| 1,207,237 A | 12/1916 | Stuart | |
| 1,783,363 A | 12/1930 | Grob | |
| 2,069,236 A * | 2/1937 | Fitch | 254/45 |
| 2,892,554 A * | 6/1959 | Decker | 414/495 |
| 2,929,519 A * | 3/1960 | Taylor | 414/590 |
| 2,934,373 A * | 4/1960 | Doty, Jr. | 414/498 |
| 2,958,538 A * | 11/1960 | Norris et al. | 414/498 |
| 3,011,663 A * | 12/1961 | Decker | 414/391 |
| 3,028,024 A * | 4/1962 | Black | 414/572 |
| 3,119,503 A * | 1/1964 | Herpich et al. | 414/495 |
| 3,135,407 A * | 6/1964 | Back | 414/498 |
| 3,151,751 A * | 10/1964 | Marini | 414/572 |
| 3,168,206 A * | 2/1965 | Washington | 410/50 |
| 3,208,608 A * | 9/1965 | Tantlinger et al. | 414/389 |
| 3,314,655 A * | 4/1967 | Steele | 254/92 |
| 3,415,490 A * | 12/1968 | Steele | 254/45 |
| 3,520,433 A * | 7/1970 | Blackburn | 414/498 |
| 3,700,128 A | 10/1972 | Noble et al. | |
| 3,807,582 A | 4/1974 | Anderson | |

(Continued)

OTHER PUBLICATIONS

John Zumerchik et al., "Automated Transfer Management Systems and the Intermodal Performance of North American Freight Distribution," Journal of the Transportation Research Forum, pp. 59-76, Fall 2009, Dec. 2009.

(Continued)

*Primary Examiner* — Saul Rodriguez
*Assistant Examiner* — Glenn Myers
(74) *Attorney, Agent, or Firm* — McCracken & Frank LLC (57) ABSTRACT

A transfer method (100) is disclosed. It includes: transporting (102) with a motorized vehicle a container on a chassis and aligning the container with a buffer; raising (104) the container with a support structure comprising an elevator connected to the chassis, from a resting position to a lifted position a predetermined height above the chassis; entering (106) a containment cavity of the buffer while in the lifted position, the buffer including a container stand including shelves located on sides on the containment cavity, to allow travel in and out of the containment cavity, the shelves include movable support pads with a retracted position configured to allow unobstructed travel in and out of the containment cavity and an extended position configured to support a container with the movable support pads on the sides on the containment cavity.

9 Claims, 6 Drawing Sheets

U.S. PATENT DOCUMENTS

| | | | |
|---|---|---|---|
| 3,891,100 A | | 6/1975 | Tamaki et al. |
| 4,040,527 A | * | 8/1977 | Krieg ................... 414/282 |
| 4,076,134 A | | 2/1978 | Landow |
| 4,093,084 A | | 6/1978 | Ringer |
| 4,139,107 A | | 2/1979 | Ninomiya et al. |
| 4,221,536 A | | 9/1980 | McFee |
| 4,522,546 A | | 6/1985 | Ringer |
| 4,522,550 A | * | 6/1985 | Whitehouse ............... 414/498 |
| 4,915,576 A | | 4/1990 | Lanigan et al. |
| 5,378,105 A | | 1/1995 | Palko |
| 5,505,585 A | | 4/1996 | Hubbard |
| 5,511,927 A | | 4/1996 | Lanigan et al. |
| 5,540,532 A | | 7/1996 | Carder et al. |
| 5,857,821 A | | 1/1999 | Wiedeck |
| 6,030,168 A | | 2/2000 | Kroll et al. |
| 6,168,366 B1 | | 1/2001 | Horn |
| 6,190,107 B1 | | 2/2001 | Lanigan, Sr. et al. ......... 414/342 |
| 6,318,947 B1 | * | 11/2001 | Hahn et al. ............... 414/401 |
| 6,439,128 B1 | | 8/2002 | Miller et al. |
| 7,123,132 B2 | * | 10/2006 | Heidenback et al. ......... 340/431 |
| 7,416,378 B1 | * | 8/2008 | Adams ................... 414/679 |
| 7,704,032 B2 | * | 4/2010 | Rash et al. ............... 414/391 |
| 7,779,604 B2 | | 8/2010 | Kapelski |
| 2003/0061085 A1 | | 3/2003 | Lanigan, Sr. |
| 2005/0244254 A1 | | 11/2005 | Schratt et al. |
| 2006/0045659 A1 | | 3/2006 | Hubbard, Sr. |
| 2006/0245879 A1 | * | 11/2006 | Lockamy et al. ........... 414/498 |
| 2006/0251498 A1 | | 11/2006 | Buzzoni et al. |
| 2006/0269379 A1 | | 11/2006 | Orr et al. |
| 2008/0141895 A1 | | 6/2008 | Lanigan et al. |
| 2008/0166211 A1 | | 7/2008 | Lanigan et al. |
| 2008/0213067 A1 | | 9/2008 | Jegers |
| 2008/0219804 A1 | | 9/2008 | Chattey |
| 2008/0219827 A1 | | 9/2008 | Lanigan et al. |
| 2008/0243301 A1 | | 10/2008 | Lanigan et al. |
| 2008/0298939 A1 | | 12/2008 | Lanigan et al. |
| 2009/0003985 A1 | | 1/2009 | Lanigan et al. |

OTHER PUBLICATIONS

Nathan Huynh et al., "Analysis of Stacking Priority Rules to Improve Drayage Operations Using Existing and Emerging Technologies," Transportation Research Record-Journal of the Transportation Research Board, pp. 1-8, Mar. 2010.

John Zumerchik et al., "An Analysis of Current Freight Performance Metrics and the Need for System-Wide Efficiency Metrics," submitted for consideration of presentation at the 91st Annual Meeting of the Transportation Research Board and Publication in the Transportation Research Record, pp. 1-16, submission Jul. 31, 2010.

Jean-Paul Rodrigue, "The Thruport Concept and Transmodal Rail Freight Distribution in North America," Journal of Transport Geography vol. 16, pp. 233-246, 2008, Jul. 2008.

Jack Lanigan, Sr. et al., "Next Generation Intermodal Terminals: Prospects for Improving Train and Truck Turn Times," pre-publication, pp. 1-15, Sep. 2009.

John Zumerchik et al., "Sustainable Intermodal Rail Terminals: Cost Functions for Conventional and Advanced Terminals," pp. 1-2, Dec. 2009.

Jack Lanigan, Sr., et al. "Shared Intermodal Terminals and the Potential for Improving the Efficiency of Rail-Rail Interchange," Transportation Research Board Committee on Intermodal Freight Terminal Design and Operations (AT050), pp. 1-17, 2007, Jan. 2007.

* cited by examiner

DISTRIBUTION SYSTEM

FIELD OF THE INVENTION

This invention relates to transportation and logistics systems, and more particularly to a Distribution System.

BACKGROUND OF THE INVENTION

Freight transport continues to grow at a rapid pace, especially in the heavy-rail sector. Severe bottlenecks are seen in existing rail transfer terminals, which result in freight delays. Most such terminals have little or no right-of-way available for terminal expansion. Inefficiencies associated with moving containers from terminal to terminal by truck, to transfer between long-distance rail carriers (corridors), introduce significant delays, costs and inefficiencies. Further, truck activity on urban and suburban freeways cause increased fuel consumption and pollution emissions.

In connection with transportation logistics, market forces are driving the development of new technologies to improve the efficiency of freight transfer operations at rail and port terminals, hubs and distribution centers. There is a need for distribution, buffer and/or pathfinder systems relative to a rail, hub and/or distribution facility, where containers and freight can be exchanged with a high degree of automation, lower costs and improved efficiencies.

There is a need for the development of new technologies to improve the efficiency of freight transfer operations at distribution warehouses, hubs and rail and port terminals.

DESCRIPTION OF A PREFERRED EMBODIMENT

Figures 1A, 1B, 1C:
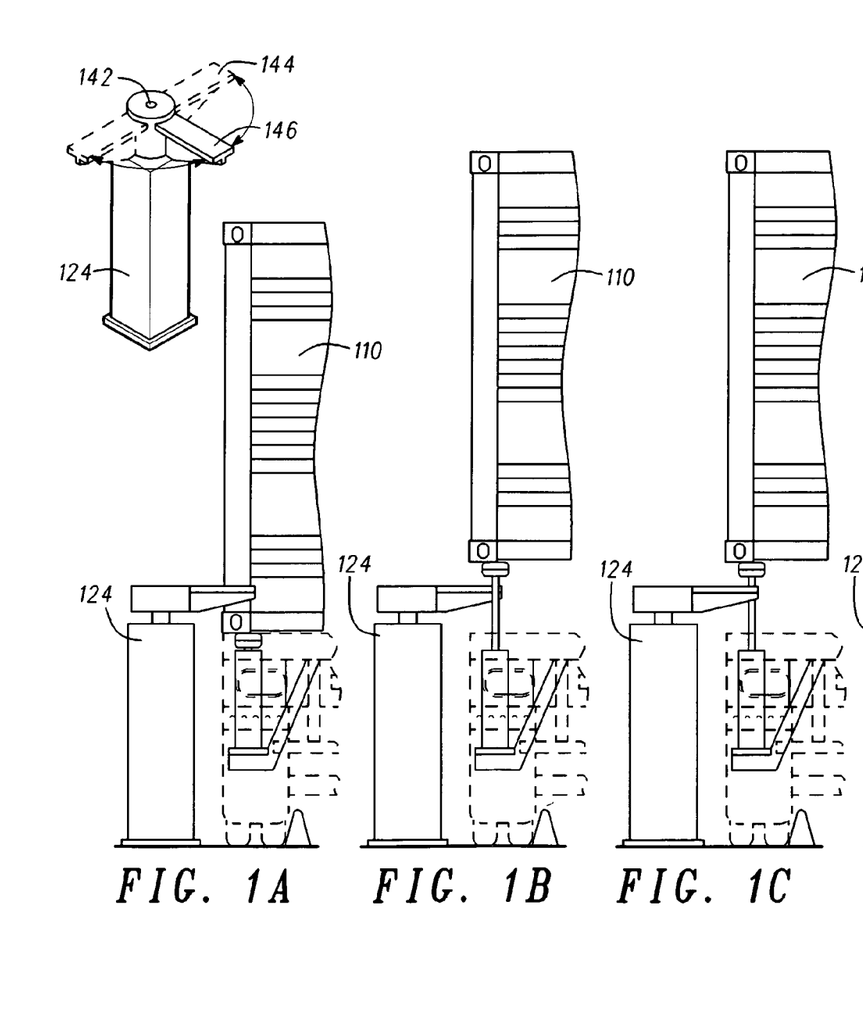
FIG. 1 is a plan view of a Distribution System, showing a number of steps A-D, in succession, such as: (A) transporting 102 a container 110 on a chassis 112 of a tractor trailer 114 to and aligning it with a buffer 116; (B) raising 104 the container 110 with a support structure 118 a predetermined height; (C) entering 106 a containment cavity 122 of the buffer 116; (D) lowering 108 the container 110 on a container stand 124 of the buffer 116, to allow the chassis 112 to exit while allowing the container 110 to remain; and (E) shows a chassis vacated from the containment cavity 122, with a container 110 sitting on the container stand 124 of the buffer 116, in accordance with the invention.
Figures 1D, 1E:
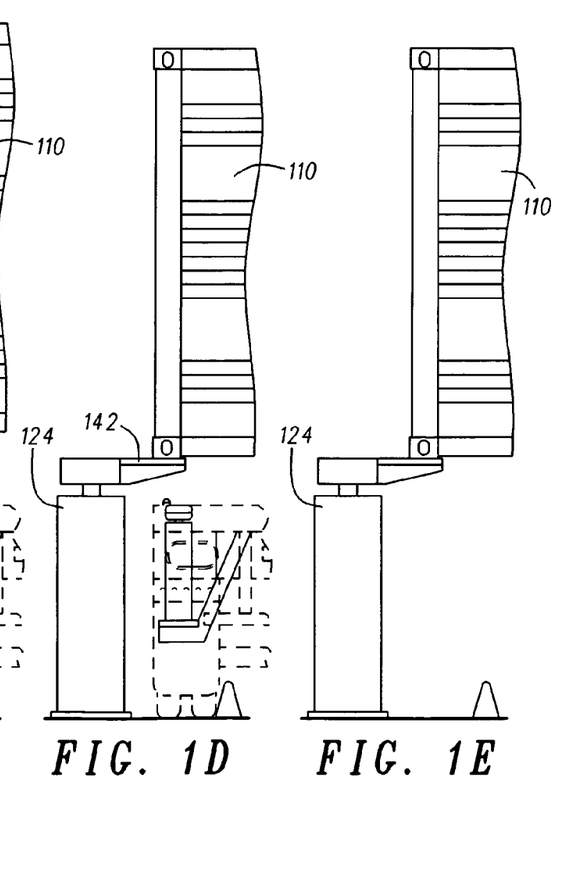

In its simplest form, a distribution, hub and transportation system 100 is shown in sequence A-E (hereafter referred to interchangeably as system or distribution system). The distribution system 100 includes the steps of: transporting 102 a container 110 on a chassis 112 of a tractor trailer 114 to and aligning it with a buffer 116; raising 104 the container 110 with a support structure 118 a predetermined height; entering 106 a containment cavity 122 of the buffer 116; and lowering 108 the container 110 on a container stand 124 of the buffer 116, to allow the chassis 112 to exit while allowing the container 110 to remain.

The system is simple in method and construction, and provides for efficiencies in the transportation and logistics industry, by allowing drivers to drop off containers at off peak hours and go to their next pick up. Likewise, it allows a distribution manager to plan and have that days freight delivered and in place and ready to be distributed at the start of a shift.

The term "container" as used herein has its common ordinary meaning, and can include any type of container, such as an ISO container, domestic container, semi-trailer, enclosure, trailer and the like, as understood by those skilled in the art. In a preferred embodiment, ISO and domestic containers with conventional corner castings work well in this system.

The terms "tractor, truck and tractor trailer" have their generally accepted meanings and are generally used interchangeably. These vehicles are used to pull, carry and/or haul containers.

In a preferred application, the buffer 116 is used in connection with and located in proximity to at least one of a dock of a distribution warehouse and a track or port side location. This allows crane operators, distribution personnel and drivers to work independently, for improved efficiencies.

The system provides improved utilization of the available space and improved efficiency for loading and unloading of distribution docks and train terminals, resulting in substantial savings in distribution and handling costs, in turn enabling rail, distribution and trucking costs to be more cost competitive.

In more detail, a locating step can include: positioning a plurality of buffers substantially adjacent to a dock or track side location in proximity to train rails, at the track side location; locating each of the plurality of buffers substantially immediately adjacent to each other; and placing each of the plurality of buffers in a substantially parallel arrangement with respect to an immediately adjacent buffer. This step provides a group of clustered buffers for maximum efficiencies in a fixed space, thus utilizing the available space efficiently.

As should be understood by those skilled in the art, the system herein is adapted to accommodate a plurality of containers, tractor trailers, chassis and movement of containers independently and in an integrated fashion, to provide a steady flow of processing of containers, for example loading, unloading and reloading in and out of terminals, loading docks and the like. Likewise, the system provides advantages to all associated loading and unloading workers, drivers, logistics and maintenance personnel.

In one embodiment, an unlocking step is provided, which includes unlocking a plurality of twist locks 130 connecting the chassis 112 and container 110 using in box connectors (IBCs) 132, prior to the raising step 104. As is known by those in the art, twist locks 130 connect containers 110 and chassis 112 during transport, for safety. Simply stated, they need to be disconnected in order to separate the container and chassis.

Figure 2:
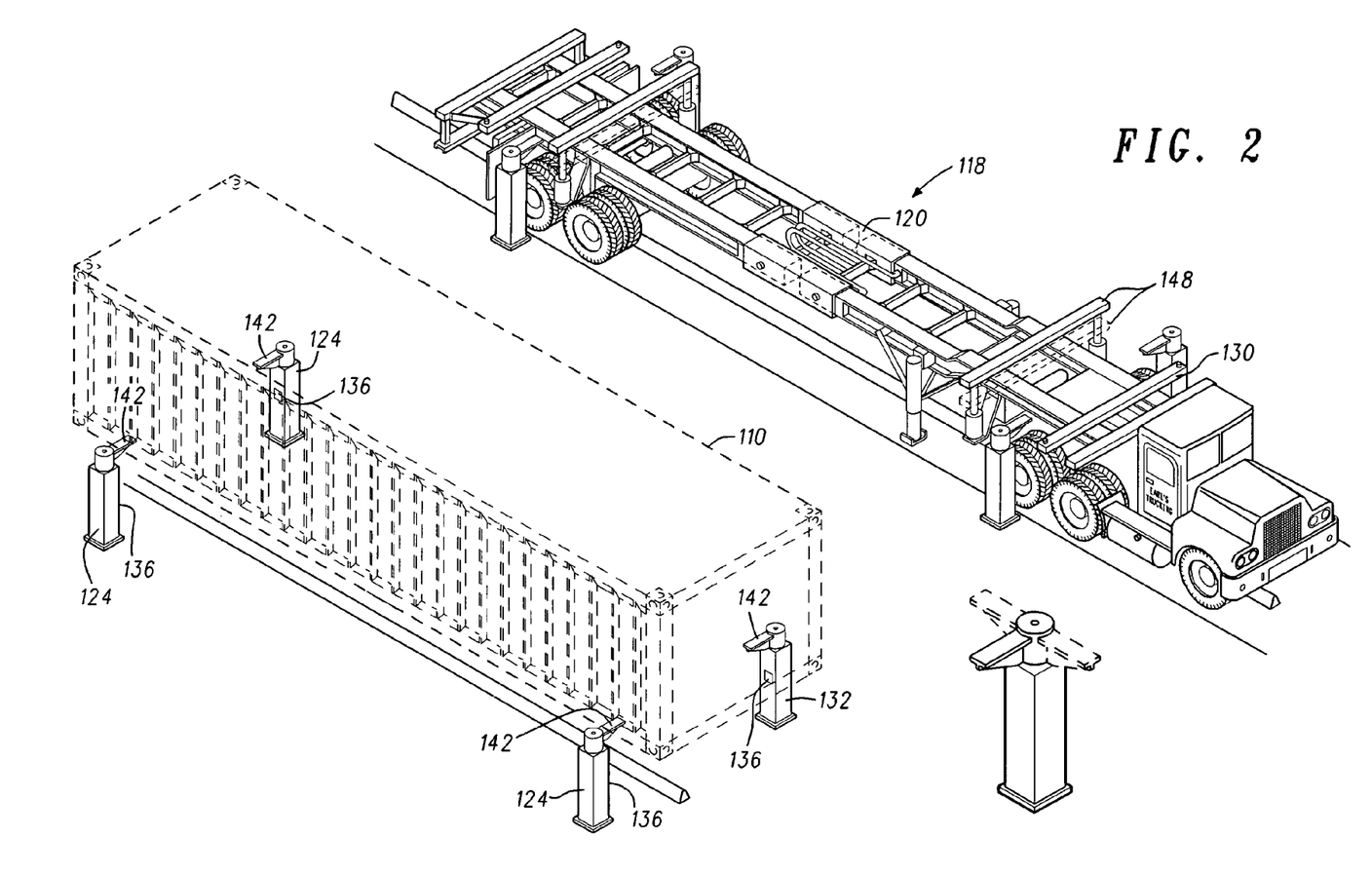
FIG. 2 is an elevated perspective view of the Distribution System in FIG. 1, showing a chassis 112 with a support structure 118, a tractor trailer 114, a container 110 in a cut away view (which would in normal operation be sitting on the support structure 118 or movable shelf 142), a buffer 116 with movable shelves 142 having a retracted position 144 and extended position 146, and lift pads 148 connected to the chassis 112, operable with a lift control, to raise or lower the support structure 118, in accordance with the instant invention.
Figure 3:
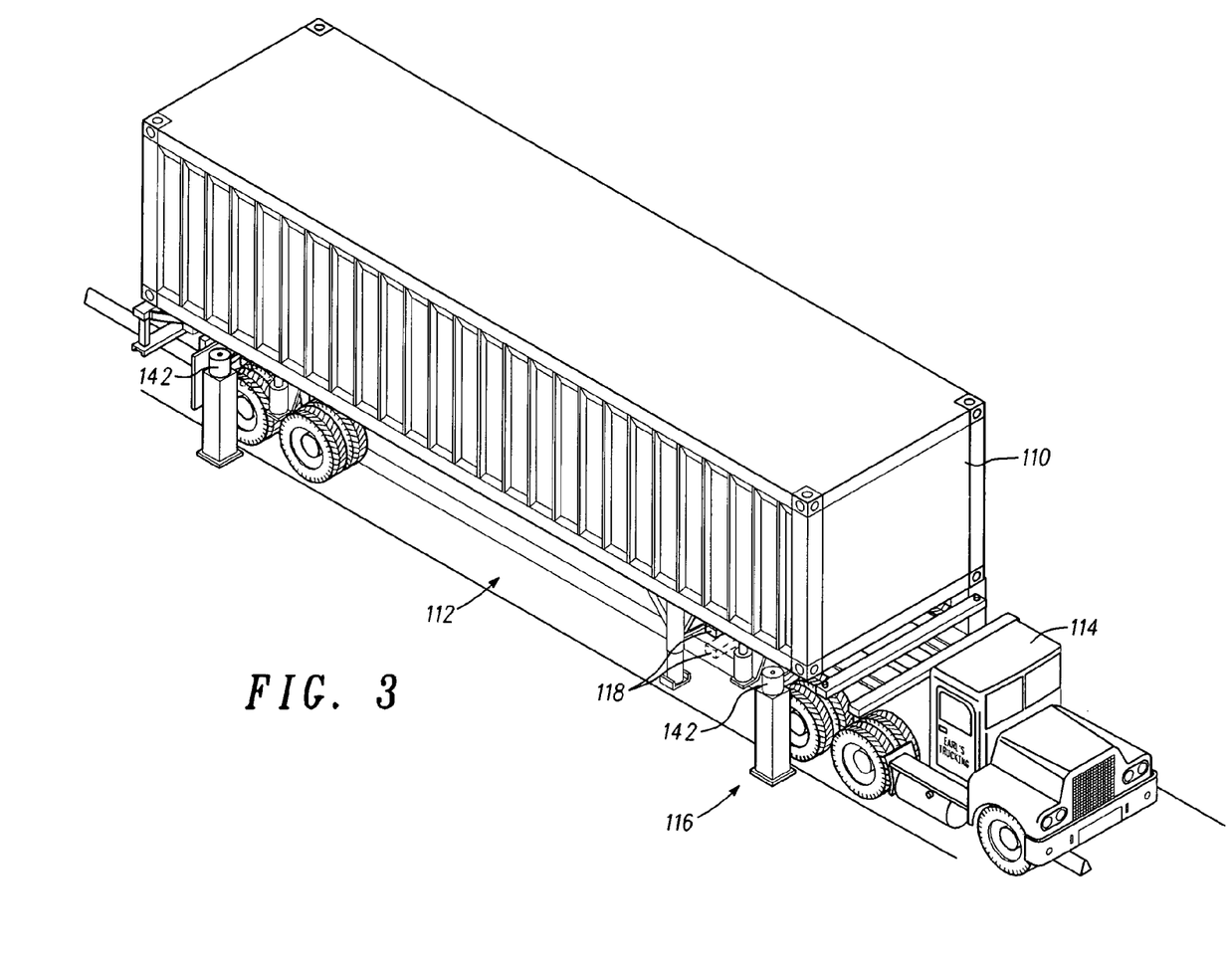
FIG. 3 is an elevated perspective view of the Distribution System in FIG. 1, showing a chassis 112 with a support structure 118, a tractor trailer 114, a container 110 sitting on the support structure 118 in a raised position, above the movable shelf 142 and a buffer 116 with movable shelves 142 in an extended position 146(pointed inwardly toward the containment cavity, in accordance with the instant invention.

In a preferred embodiment, a sensing step is provided using a sensing mechanism 136, shown in FIG. 2, which includes sensing proper alignment of the container 110 with respect to the container stand 124, prior to the lowering step 108. As should be understood, many types of sensing mechanisms can be used, such as metal detection, proximity detection, RFIDs and the like, for improved automation and repeatability and quicker operations.

In addition, a locking step can be included, to lock the container 110 to the buffer 116 with a lock 138, for additional security, as shown in FIG. 2 (left portion). This provides an advantage of efficiently distributing and transporting cargo as desired, by allowing a driver to go to a next desired location, after delivery of a container, for example.

In a preferred embodiment, the entering step 106 includes providing guides 140 for substantially aligning the tires of the chassis 112 and container 110 with respect to the container stand 124. This step substantially automatically helps to align the container 110 in the containment cavity 122, by requiring the driver's chassis 112 tires to be properly aligned with the guide 140, thus providing a more reliable, repeatable and efficient alignment process.

Turning to the raising step 104, it can include providing the support structure 118 with an elevator 120 connected with and integrated into the chassis 112, as best shown in FIG. 2. In more detail, the raising and lower steps 104 and 108 can include, providing at least one of pneumatic, electric, hydraulic and mechanical means or systems, to raise or lower the container 110 with respect to the chassis 112, utilizing the elevator 120. The elevator 120 structure will be discussed in more detail below.

The system 100 shown in FIGS. 1 and 2, can further include the steps of: providing the container stand 124 with a movable shelf 142, to support the container 110 at a predetermined height (FIG. 1, item D), whereby a chassis 112 can subsequently enter the containment cavity 122 to transport the container 110 away (not illustrated in the figures) or exit the containment cavity 122, while allowing the container 110 to remain (as illustrated in FIG. 1, item E); and locating and constructing the shelf 142, to allow substantially free and unobstructed entering and exiting of the containment cavity 122.

In more detail, the providing step includes the container stand 124 with a plurality of shelves 142, to support the container 110 at a predetermined height (FIG. 1, item D), adapted to allow a chassis 112 to exit the containment cavity 122, while allowing the container to remain 110 (as illustrated in FIG. 1, item E) or subsequently, for example, after the container has been unloaded(populating a buffer), a second chassis can again enter the containment cavity 122 to pick up(raise) the container 110 ( as shown in FIG. 1, item B) and transport the container 110 away. As should be understood, this provides additional efficiencies, as various loading, crane and driver personnel, can work independently, thus eliminating waiting time or gating issues, for a driver or distribution personnel, for example.

This provides an efficient method of delivering, loading and unloading containers in a "self serve" like manner, freeing up a truck operator and dock/terminal personnel to work independently.

In a preferred embodiment, the system 100 in FIG. 1, includes: providing the container stand 124 with a movable shelf 142, to support the container at a predetermined height, whereby a chassis can exit the containment cavity 122, while allowing the container 110 to remain in the containment cavity 122, including: retracting the movable shelf, shown as a retracted poison 144, such that the container 110 can enter the containment cavity 122 in a substantially unobstructed manner; and extending the movable shelf, shown as an inwardly pointing extended position 146, such that it can support the container 110 at a predetermined height, such as shown in FIG. 1, item D. The system 100 and structure herein, provides for ease in entering and exiting the containment cavity 122, whether or not the chassis 112 has a container 110 or not(populated or unpopulated, respectively).

In more detail, the retracted position 144 is adapted to allow substantially free entry and exiting to and from the containment cavity 122; and the extended position 146 is adapted to support the container 110(when a buffer is populated).

Figure 5:
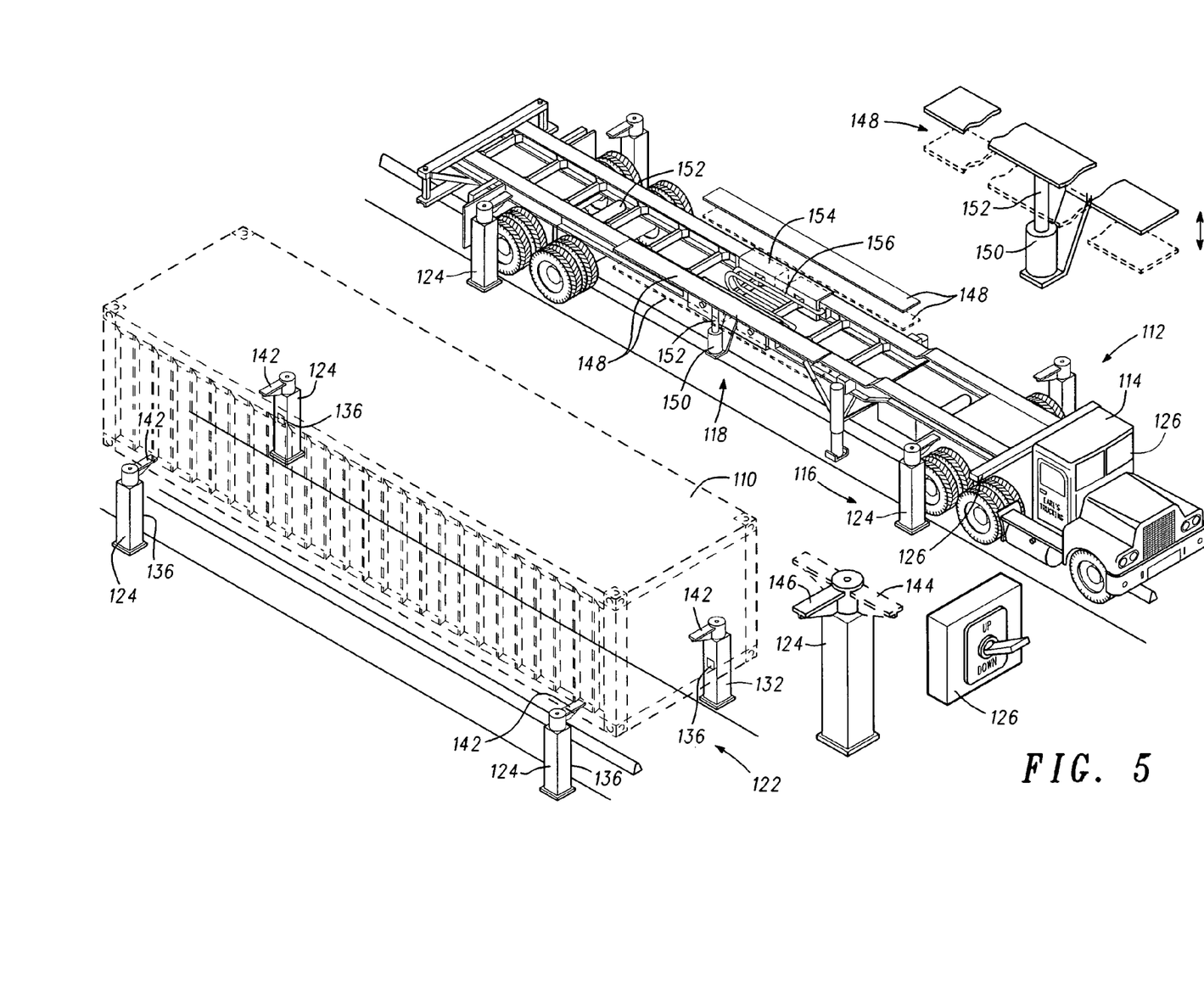
FIG. 5 is an elevated perspective view of an alternative embodiment of the Distribution System in FIG. 1, showing a chassis 112 with a support structure 118, a tractor trailer 114, a container 110 in a cut away view (which would in normal operation be sitting on the support structure 118 or movable shelf 142), a buffer 116 with movable shelves 142 having a retracted position 144 and extended position 146, and a lift control 126 to raise or lower the support structure 118 with two elongated lift pads 148 connected to the chassis 112, in accordance with the instant invention.
Figures 6A, 6B:
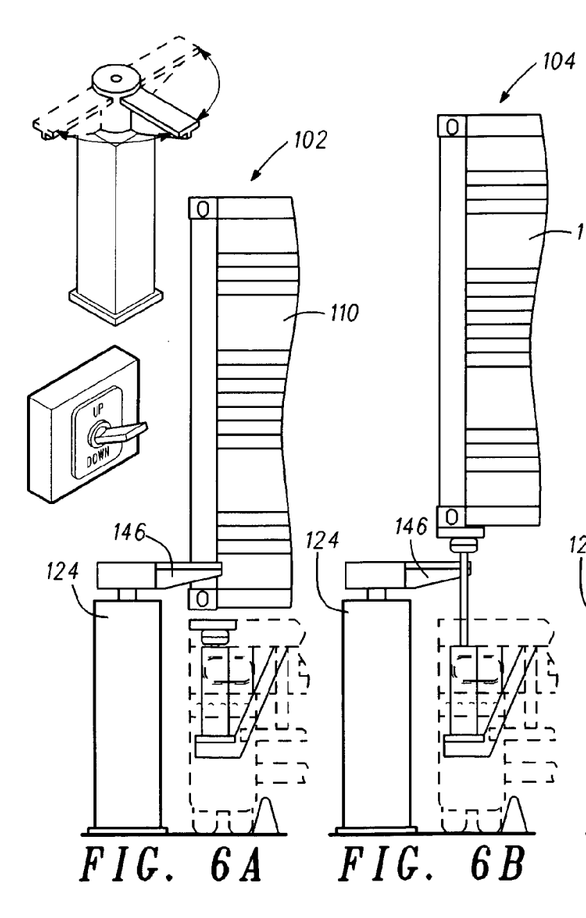
FIG. 6 is a plan view of an embodiment of a Distribution System, showing a number of steps A-D, in succession, such as: (A) transporting 102 a container 110 on a chassis 112 of a tractor trailer 114 to and aligning it with a buffer 116; (B) raising 104 the container 110 with a support structure 118 a predetermined height; (C) entering 106 a containment cavity 122 of the buffer 116; (D) lowering 108 the container 110 on a container stand 124 of the buffer 116, to allow the chassis 112 to exit while allowing the container 110 to remain; and (E) shows a chassis vacated from the containment cavity 122, with a container 110 sitting on the container stand 124 of the buffer 116, in accordance with the invention.
Figures 6C, 6D:
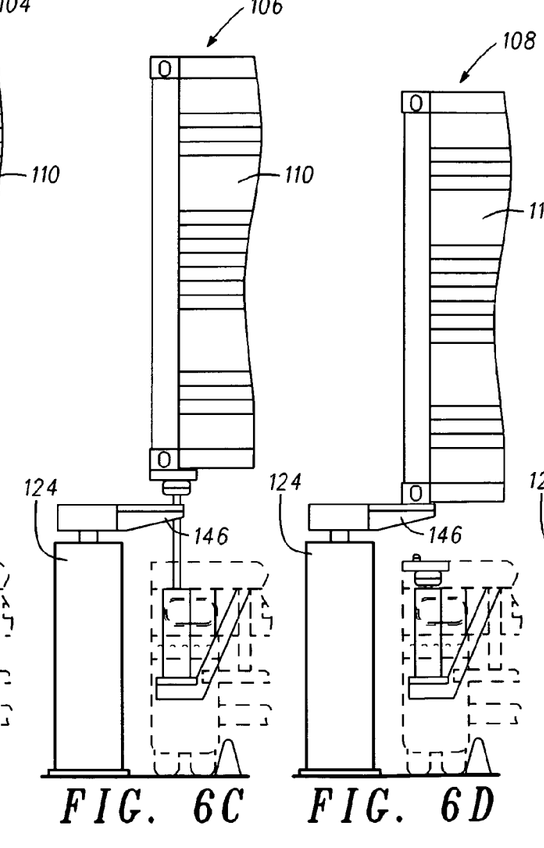
Figure 6E:
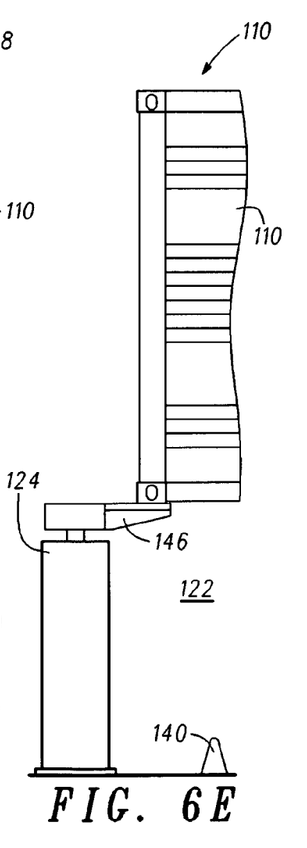

In yet more detail, as shown in FIG. 5, the support pads 148 can be raised to the up position, by toggling the switch 126 to the up-load position to raise the pads 148, via pneumatically, hydraulically, electrically, mechanically and the like, preferably pneumatically or hydraulically, for simplicity in configuration and design, to raise/lower the container 110. When hydraulic, the switch 126 activates a valve and sends air to a lift cylinder 150. The air can be supplied by the existing braking system or an auxiliary reservoir 158, independent from the brake system. Air sent to the lift cylinder 150 extends a rod 152 to raise the pads 148. The pads 148 contact a bottom side of the container 110 to lift it above the chassis 112(at a resting position). In the context of the system 100, this is typically done prior to entering the containment cavity 122. Next, the tractor trailer 114 preferably backs into (or pulls into) the containment cavity 122, to be in a position to deliver the container 110 to the containment cavity 122, on the container stands 124. Next, the control 126 is actuated to lower the container 110 onto the movable shelf 142. Subsequently, the chassis 112, via a tractor trailer 114, exits the containment cavity 122, thereby delivering the container 110 to and populating the buffer 116 with the container 110.

Similarly, when a chassis 112 is appropriately in the containment cavity 122 (and located below the container 110 in a populated buffer example), to pick up and transport the container 110 to a desired location, the immediately above operation can be utilized to raise the container 110 above the container stand 124 and the movable shelf 142, prior to exiting the containment cavity 122.

Conversely, the toggle switch 126 can be actuated "down" or lowered, to a load position, to lower the container 110 onto the chassis 112. This is typically done after the chassis 112 with the container 110 has exited from the containment cavity 122. In this case, the switch 126 activates the valve to exhaust the air out of the cylinder 150, the rod 152 retracts into the cylinder 150 and the pads 148 are lowered until the container 110 rests on the chassis 112. As understood by those in the art, hydraulics would work in a similar way as detailed above.

As shown in FIG. 5, in a preferred embodiment, the chassis 112 includes an air reservoir 158, chassis frame adjustable slide 154, to adjust the length of the chassis 112, and hose track 156 to maintain the hose(s) in a desired position. As should be understood by those skilled in the art, many components of the system 100 can be retro-fit and integrated into conventional chassis.

As shown in FIG. 1, the movable shelf 142 includes a rotatable lift or support pads with auto centering, when at rest, in a preferred embodiment. This provides a simply and robust method and structure to expedite entering, exiting and re-entering the containment cavity 122.

Figure 4:
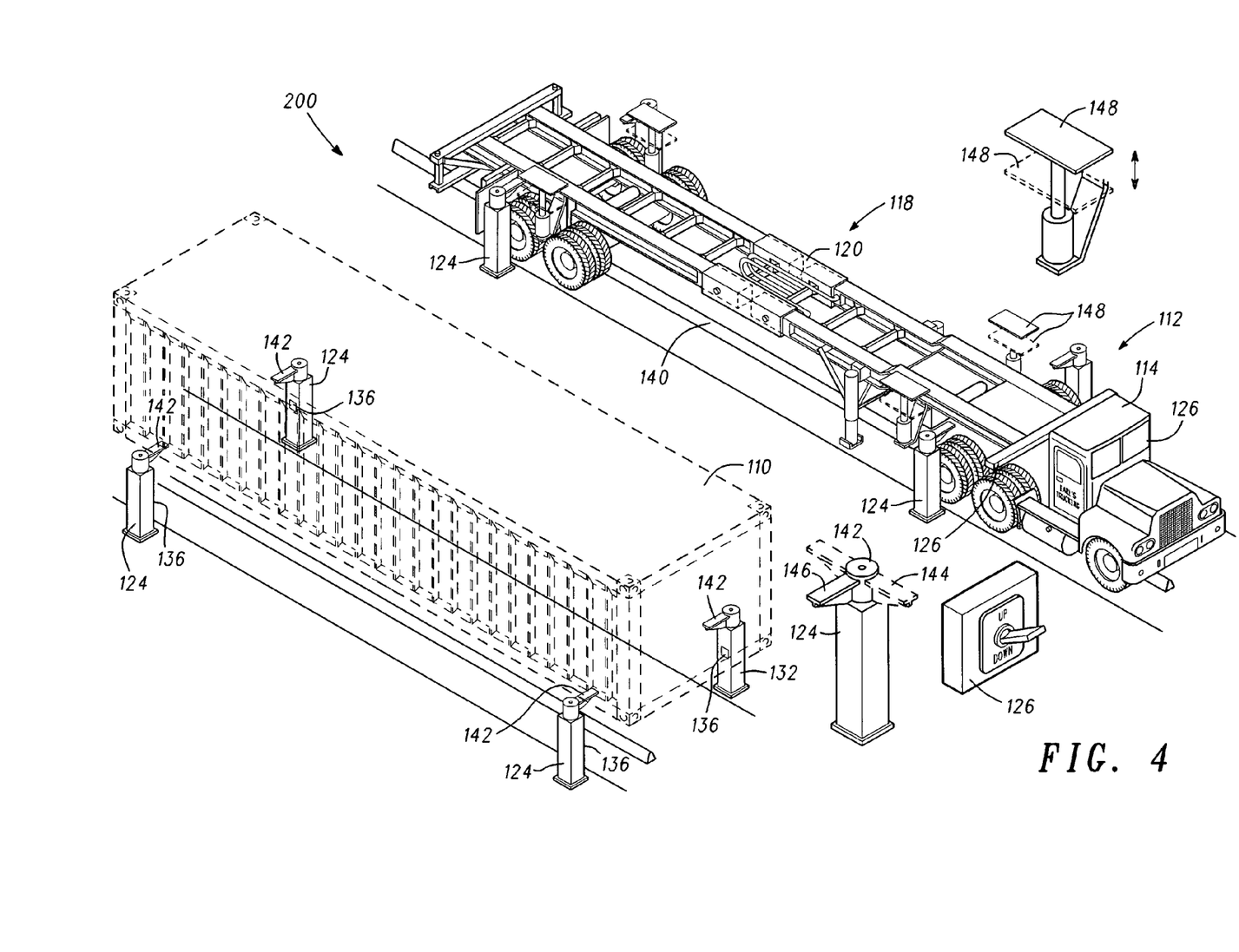
FIG. 4 is an elevated perspective view of an alternative embodiment of the Distribution System in FIG. 1, showing a chassis 112 with a support structure 118, a tractor trailer 114, a container 110 in a cut away view (which would in normal operation be sitting on the support structure 118 or movable shelf 142), a buffer 116 with movable shelves 142 having a retracted position 144 and extended position 146, and a lift control 126 to raise or lower the support structure 118 with lift pads 148(having up and down positions), in accordance with the instant invention.

In another embodiment, a distribution system 200 is shown in FIG. 4, which includes: a chassis 112 adapted to receive a container 110 and being transportable by a tractor trailer 114, the chassis 112 including a support structure 118 to raise or lower the container 110 on a container stand 124; a buffer 116 including the container stand 124 adapted to receive the container 110 having a containment cavity 122; the container stand 124 including a movable shelf 142 with a retracted position 144 adapted to allow substantially free entry and exiting to and from the containment cavity 122 and an extended position 146 adapted to support the container 110, to allow the chassis 122 to exit while allowing the container 110 to remain.

The system provides an efficient system for delivery to or from a loading dock, track side terminal or port terminal, for example. Advantageously, there is little or no need for "real time" synchronization between the gate, distribution personnel, crane and/or truck operators.

This system provides a simple in construction, robust, repeatable and efficient method to load and unload, as detailed herein, a container on a chassis or buffer, respectively. Likewise, this system allows a truck operator and dock or terminal personnel to work independently.

In a preferred embodiment, the buffer 116 and support structure 118, are used in connection with at least one of a dock of a distribution warehouse, a track terminal and a port terminal, for improved efficiencies of equipment and personnel.

Preferably, the buffer 116 further includes at least one or more guides 140 for substantially aligning the chassis 112 and container 110 with respect to the container stand 124, which defines the containment cavity 122, as shown in FIG. 4, for improved and repeatable entry and exiting.

In addition, in a preferred embodiment, the support structure 118 comprises an elevator 120 including at least one of pneumatic, electric, hydraulic and mechanical means or systems, to raise or lower the container 110, which is carried on the support structure 118 with respect to the chassis 112. As should be understood by those skilled in the art, the elevator can be retrofitted to and integrated in a conventional chassis.

Advantageously, this provides a robust structure and system, for simplified transportation and delivery to and from terminals, docks and the like.

Also, the movable shelves 142 are located and constructed to facilitate entering and exiting of the containment cavity 122, whether or not a chassis is populated with a container. In more detail, the movable shelf 142 is adapted to support the container at a predetermined height, whereby either: (i) a second chassis 112 can subsequently re-enter the containment cavity 122, lift the container, as shown in FIG. 1, item B, and transport the container 110 away; or (ii) exit the containment cavity 122, while allowing the container 110 to remain, as shown in FIG. 1, item E. Again, this structure and system allows simplified entry and exiting to and from the containment cavity 122, with or without a container, for improved efficiencies of equipment and personnel. Referring to FIG. 4, the movable shelf 142 includes a plurality of shelves with rotatable support pads 142 with auto spring-loaded centering.

Detailed below are some benefits of the system 100. If receiving docks and terminals are equipped with a plurality of buffers (hereafter also referred to as pathfinder stations), the cost savings can be apparent to truck line carriers, ship lines, docks and the company using buffers, to receive container freight.

A company's normal business operation will not be interrupted for full loads of freight in a container. Presently, typically anytime a truck line carrier arrives to deliver freight it must be unloaded in one hour or there will be an extra charge to the receiving party for the driver's time and equipment utilization. This surcharge will no longer be a concern for company's with a pathfinder and system described herein.

Once a driver is in position to deliver the container from the chassis to the chassis stand, it can take as little as ten minutes or less. This allows him or her to go to his or her next destination, possibly picking up another container at this location, without having to make an unnecessary trip without a container. In more detail, to minimize empty loads and bobtails, if there is an adjacent container stand or buffer with a loaded container(populated) ready for pickup, the driver will be able to load the adjacent container on his or her chassis, and deliver it to a desired location.

The self-service nature of this system 100, allows for truck line carriers to deliver more freight at any time of day or night. Freight in the container can be unloaded at the convenience of the warehouse receiving manager. Freight in a container can also be used as a temporary storage area on a lease per day rate. Receiving docks without buffers will be readily available to receive deliveries during normal work hours.

The option of delaying unloading of delivered containers gives warehouse managers more options, resulting in potential productivity gains of their receiving and shipping departments.

Having a number of containers pre-delivered during off hours before the start of a shift, allows an independent driver more flexibility in managing a route and more efficiencies for a warehouse manager. Terminal and distribution centers can realize enormous driver, chassis and personnel productivity gains, and eliminate bobtails and empty trips with the system 100 detailed herein.

As should be understood by those skilled in the art, various modifications can be made without departing from the inventive concepts detailed herein.

What is claimed is:
1. A transfer method, comprising the steps of:
 aligning a container on a chassis adapted to being hauled by a motorized vehicle with a stand-alone container buffer, said container buffer comprised of:

a first and a second container stand proximal to and displaced from one another by a first distance;

a third and a fourth container stand proximal to and displaced from one another by the first distance, and aligned with and separated from the first and second container stands, respectively, by a second distance that is greater than the first distance, so as to define a containment cavity;

said container stands including shelves, wherein the shelves are movable from an extended position configured to support the container, to a retracted position configured to allow unobstructed travel of the container in and out of the containment cavity;

raising the container, with a support structure comprising an elevator connected to the chassis, from a resting position to a lifted position above the chassis;

entering the containment cavity of the container buffer while in the lifted position;

lowering the support structure from the lifted position so as to position the container directly on to the shelves in the extended position, in order to allow the chassis to exit with the support structure in the resting position while allowing the container alone to remain on the shelves without any support structure, therebetween;

wherein the elevator is comprised of:

a first and a second lifting cylinder located on opposite sides of the chassis proximal to a front end of the chassis;

a third and a fourth lifting cylinder located on opposite sides of the chassis proximal to a rear end of the chassis;

a first transverse support bar extending between the first and the second lifting cylinders; and a second transverse support bar extending between the third and the fourth lifting cylinders.

2. The method of claim 1 further comprising locating the buffer in proximity to a dock of a distribution warehouse or a track side location.

3. The method of claim 2 wherein the locating the buffer in proximity to a dock of a distribution warehouse or a track side location includes:

positioning a plurality of buffers substantially adjacent to the dock or track side location;

locating each of the plurality of buffers substantially immediately adjacent to each other; and placing each of the plurality of buffers in a substantially parallel arrangement with respect to an immediately adjacent buffer.

4. The method of claim 1 further comprising unlocking a plurality of twist locks connecting the chassis and container, before raising the container.

5. The method of claim 1 further comprising sensing proper alignment of the container with respect to the container stand.

6. The method of claim 1, providing guides for substantially aligning the chassis and container with respect to the container stand.

7. The method of claim 1 further comprising transporting a second chassis in the containment cavity when the elevator is in resting position, lifting the container in the containment cavity to the raised position, and transporting the container away, defining a pick up.

8. The method of claim 7, wherein the elevator structure includes at least one of pneumatic, electric, hydraulic and mechanical means to raise or lower the container with respect to the chassis.

9. The method of claim 1 wherein movable support pads are positioned on the container stand and extend inwardly in a direction toward the containment cavity in the extended position.

* * * * *